(No Model.)
W. T. ROLLINS.
HOOF PAD.
No. 590,553. Patented Sept. 21, 1897.
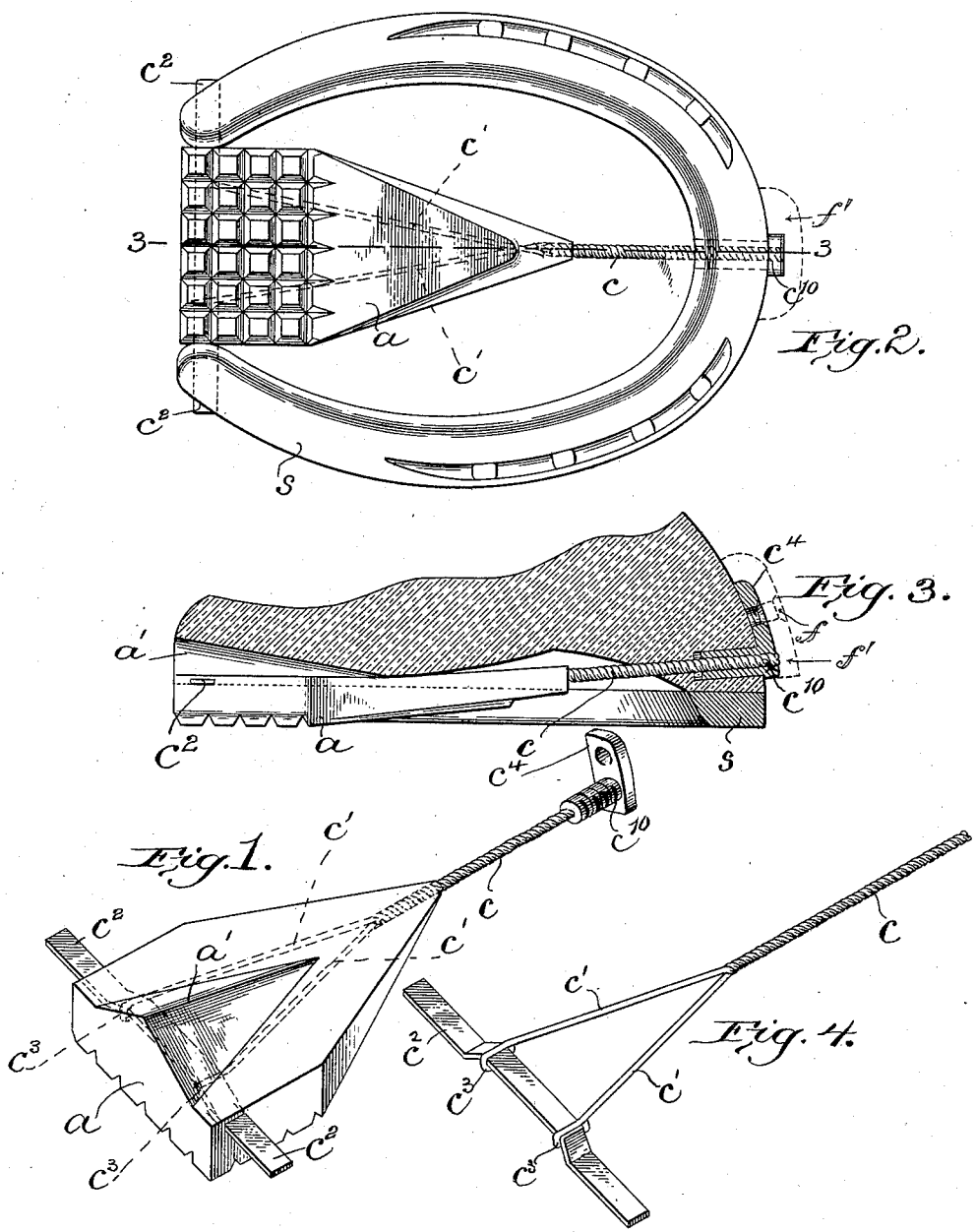
Witnesses:
A. D. Harrison
P. W. Pezzetti.
Inventor:
William T. Rollins
by Wright Brown & Quimby
attys

UNITED STATES PATENT OFFICE.

WILLIAM T. ROLLINS, OF BOSTON, MASSACHUSETTS, ASSIGNOR OF ONE-HALF TO JESSE E. HENDERSON, OF EVERETT, AND HERBERT C. GIFFORD AND CHARLES E. BOWLER, OF SOMERVILLE, MASSACHUSETTS.

HOOF-PAD.

SPECIFICATION forming part of Letters Patent No. 590,553, dated September 21, 1897.

Application filed June 24, 1897. Serial No. 642,188. (No model.)

*To all whom it may concern:*

Be it known that I, WILLIAM T. ROLLINS, of Boston, (Charlestown,) in the county of Suffolk and State of Massachusetts, have invented certain new and useful Improvements in Hoof-Pads, of which the following is a specification.

This invention relates to so-called "artificial frogs," which are formed to bear upon the bottom of a horse's hoof and are provided with means for detachable engagement, the pad being arranged to cover and protect the frog and frontal bone of the hoof by being interposed between said parts and the pavement.

The invention has for its object to provide a hoof-protecting attachment of this character in which the metallic parts which are inserted in and project from the elastic pad for engagement with the shoe and hoof shall be arranged to avoid the formation of a hard or rigid bearing under the frontal bone, thus insuring adequate protection of this part of the hoof, which is one of the most sensitive parts and is one liable to be injured by the presence of a metallic bar or piece directly below it in the elastic pad.

The invention consists in the improvements which I will now proceed to describe and claim.

Of the accompanying drawings, forming a part of this specification, Figure 1 represents a perspective view of a hoof-protecting attachment embodying my invention. Fig. 2 represents a bottom view of a hoof provided with said attachment. Fig. 3 represents a section of the hoof, shoe, and nut on line 3 3 of Fig. 2, an edge view of the pad, and a side view of the screw-threaded rod. Fig. 4 represents a perspective view of the metal frame, which is embedded in the elastic pad and secures the same to the hoof.

The same letters of reference indicate the same parts in all the figures.

In the drawings, $a$ represents a block or pad of elastic rubber, formed to bear upon the bottom of a hoof and to cover those portions of the bottom of the hoof which include the frog and the frontal bone, the pad being preferably of sufficient width to fill the space between the heel portions of the shoe $s$ and extending forward from the heel end of the shoe partly to the toe, as shown in Figs. 2 and 3. In the pad $a$ is embedded a metal attaching-frame which comprises a longitudinal screw-threaded rod $c$, projecting forward from the pad and made of sufficient length to pass through an orifice formed for its reception in the toe portion of the hoof above the shoe, the said rod being provided with a nut $c^{10}$, adapted to bear upon the front surface of the hoof, as shown in Fig. 3, and preferably elongated to enter the hoof, the elongation of the nut being externally screw-threaded to engage the hoof. The rear portion of the rod $c$, which is embedded in the pad $a$, is forked to form two divisions $c'$ $c'$, which diverge from each other at the point where they join the body of the rod and are separated at their rear ends. The rod $c$ and its branches $c'$ $c'$ are preferably made from lengths of wire twisted together to form the body of the rod the convolutions forming the screw-thread, which engages the nut $c^{10}$. The said attaching-frame also comprises a cross-bar $c^2$, which is embedded in and extends through the rear portion of the pad, substantially at right angles with the rod $c$, the ends of the cross-bar projecting from the edges of the pad far enough to enter crevices between the bottom of the hoof and the heel ends of the shoe. The divisions $c'$ of the rod $c$ are provided with hooks $c^3$ at their rear ends, which are engaged with the cross-bar $c^2$.

The attachment is secured to the hoof by inserting the rod $c$ in the orifice in the toe portion of the hoof and then moving the attachment forward until the ends of the cross-bar $c^2$ enter the crevices between the hoof and the ends of the shoe, the attachment being secured in place by the nut $c^{10}$, which in being turned to place draws the rod $c$ forward and thus adjusts the pad to its proper position.

The divisions $c'$ $c'$ of the rod $c$, diverging from each other, as shown, and the cross-bar $c^2$, engaged with the rear ends of said divisions, form a frame which surrounds, but does not pass through, the portion of the pad under the frontal bone of the hoof. Hence the elasticity of the portion of the pad which is interposed between the frontal bone and the pavement is not impaired, and said portion is left perfectly free to yield to the pressure of the parts above it. By this construction I avoid any injurious bearing of the attachment upon the more delicate and sensitive parts of the bottom of the hoof.

On the upper side of the pad $a$ is formed a wedge-shaped protuberance $a'$, formed to enter the corresponding recess in the frog and by its pressure against the frog keep the latter properly spread and prevent its contraction.

The nut $c^{10}$ is preferably provided with an arm $c^4$, which is provided with a tapped orifice adapted to receive a screw $f$, which secures a toe-weight $f'$. (See dotted lines in Figs. 2 and 3.) The toe-weight is thus attached to the hoof without mutilation of the hoof, no holes being required in the hoof for the purpose of receiving toe-weight-attaching screws, the single hole made to receive the rod $c$ being all that is required.

I claim—

1. A hoof-protecting attachment comprising an elastic pad or frog formed to bear on the bottom of the hoof, a forked rod having its forked portion embedded in the pad, the body of said rod extending forward from the pad far enough to pass through the toe portion of the hoof, a nut engaged with said rod and adapted to bear in the front surface of the hoof, and a cross-bar engaged with the ends of the forks of the rod and projecting from the edges of the pad in position to be inserted between the bottom of the hoof and the heel portions of the shoe, the said cross-bar and the forked rod forming a frame which surrounds but does not pass through the portion of the pad under the frontal bone of the hoof, so that the elasticity of said portion is not impaired by the said frame.

2. A hoof-protecting attachment comprising an elastic pad, a threaded rod extending forward from the pad and adapted to pass through an orifice formed in the toe portion of the hoof, and a nut engaged with said rod and having a toe-weight-supporting arm formed to bear on the front surface of the hoof.

In testimony whereof I have signed my name to this specification, in the presence of two subscribing witnesses, this 18th day of June, A. D. 1897.

WILLIAM T. ROLLINS.

Witnesses:
HERBERT C. GIFFORD,
C. F. BROWN.